United States Patent
Li et al.

(10) Patent No.: US 10,797,833 B2
(45) Date of Patent: Oct. 6, 2020

(54) TECHNIQUES AND APPARATUSES FOR ULTRA RELIABLE LOW LATENCY HYBRID AUTOMATIC REPEAT REQUEST (HARQ) RETRANSMISSION FOR SEMI-PERSISTENT SCHEDULING (SPS)

(71) Applicant: QUALCOMM Incorporated, San Diego, CA (US)

(72) Inventors: Chong Li, Weehawken, NJ (US); Junyi Li, Chester, NJ (US); Rajat Prakash, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 93 days.

(21) Appl. No.: 16/148,927

(22) Filed: Oct. 1, 2018

(65) Prior Publication Data
US 2019/0103946 A1  Apr. 4, 2019

Related U.S. Application Data

(60) Provisional application No. 62/568,110, filed on Oct. 4, 2017.

(51) Int. Cl.
*H04L 1/18* (2006.01)
*H04L 1/00* (2006.01)

(52) U.S. Cl.
CPC .......... *H04L 1/1887* (2013.01); *H04L 1/1861* (2013.01); *H04L 1/1893* (2013.01); *H04L 1/1896* (2013.01); *H04L 1/0003* (2013.01); *H04L 1/1812* (2013.01)

(58) Field of Classification Search
CPC ... H04L 1/0003; H04L 1/1812; H04L 1/1861; H04L 1/1887; H04L 1/1893; H04L 1/1896
See application file for complete search history.

(56) References Cited

U.S. PATENT DOCUMENTS

| 2018/0070341 | A1* | 3/2018 | Islam | H04W 72/042 |
| 2018/0213549 | A1* | 7/2018 | Kim | H04W 28/0278 |
| 2018/0317213 | A1* | 11/2018 | Islam | H04L 1/1812 |

OTHER PUBLICATIONS

Huawei et al., "On Supporting Ultra-Reliability in a Resource Efficient Way", 3GPP Draft; R1-1717083, 3rd Generation Partnership Project (3GPP), Mobile Competence Centre; 650, Route Des Lucioles; F-06921 Sophia-Antipolis Cedex; France vol. RAN WG1, No. Prague, Czech Republic; Oct. 9, 2017-Oct. 13, 2017 Oct. 2, 2017, XP051352189, Retrieved from the Internet: URL:http://www.3gpp.org/ftp/tsg_ran/WG1_RL1/TSGR1_90b/Docs/ [retrieved on Oct. 2, 2017], 5 pages.

(Continued)

*Primary Examiner* — Saad A. Waqas
(74) *Attorney, Agent, or Firm* — Harrity & Harrity, LLP

(57) ABSTRACT

Certain aspects of the present disclosure generally relate to wireless communication. In some aspects, a user equipment may receive a configuration for hybrid automatic repeat request (HARQ) retransmissions for semi-persistent scheduling (SPS), wherein the configuration, which is specific to the UE, identifies allocated resources of a physical downlink shared channel (PDSCH) or a physical uplink shared channel (PUSCH) for the HARQ retransmissions; and use the allocated resources identified in the configuration for the HARQ retransmissions. Numerous other aspects are provided.

30 Claims, 9 Drawing Sheets

(56) References Cited

OTHER PUBLICATIONS

Partial International Search Report—PCT/US2018/053964—ISA/EPO—Jan. 3, 2019.
QUALCOMM Incorporated: "The Necessity of Reliable SR Design for GF/GB UL URLLC Transmission", 3GPP Draft; R1-1718567 the Necessity of Reliable SR Design for GF/GB UL URLLC Transmission, 3rd Generation Partnership Project (3GPP), Mobile Competence Centre; 650, Route Des Lucioles; F-06921 Sophia-Antipolis Cedex; France vol. RAN WG1, No. Prague, Czech Republic; Oct. 9, 2017-Oct. 13, 2017 Oct. 3, 2017, XP051353134, Retrieved from the Internet: URL:http://www.3gpp.org/ftp/tsg_ran/WG1_RL1/TSGR1_90b/Docs/ [retrieved on Oct. 3, 2017], 6 pages.
International Search Report and Written Opinion—PCT/US2018/053964—ISA/EPO—dated Mar. 19, 2019.

* cited by examiner

TECHNIQUES AND APPARATUSES FOR ULTRA RELIABLE LOW LATENCY HYBRID AUTOMATIC REPEAT REQUEST (HARQ) RETRANSMISSION FOR SEMI-PERSISTENT SCHEDULING (SPS)

CROSS-REFERENCE TO RELATED APPLICATIONS UNDER 35 U.S.C. § 119

This application claims priority to U.S. Provisional Patent Application No. 62/568,110, filed on Oct. 4, 2017, entitled "TECHNIQUES AND APPARATUSES FOR ULTRA RELIABLE LOW LATENCY HYBRID AUTOMATIC RETRANSMISSION REQUEST (HARQ) RETRANSMISSION FOR SEMI-PERSISTENT SCHEDULING (SPS)," which is hereby expressly incorporated by reference herein.

FIELD OF THE DISCLOSURE

Aspects of the present disclosure generally relate to wireless communication, and more particularly to techniques and apparatuses for ultra reliable low latency hybrid automatic repeat request (HARQ) retransmissions for semi-persistent scheduling (SPS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include receiving a configuration for hybrid automatic repeat request (HARQ) retransmissions for semi-persistent scheduling (SPS); wherein the configuration, which is specific to a UE, identifies allocated resources of a physical downlink shared channel (PDSCH) or a physical uplink shared channel (PUSCH) for the HARQ retransmissions; and using the allocated resources identified in the configuration for the HARQ retransmissions.

In some aspects, a UE for wireless communication may include memory and one or more processors operatively coupled to the memory. The memory and the one or more processors may be configured to receive a configuration for hybrid automatic repeat request (HARQ) retransmissions for semi-persistent scheduling (SPS); wherein the configuration, which is specific to the UE, identifies allocated resources of a physical downlink shared channel (PDSCH) or a physical uplink shared channel (PUSCH) for the HARQ retransmissions; and use the allocated resources identified in the configuration for the HARQ retransmissions.

In some aspects, a non-transitory computer-readable medium may store one or more instructions for wireless communication. The one or more instructions, when executed by one or more processors of a UE, may cause the one or more processors to receive a configuration for hybrid automatic repeat request (HARQ) retransmissions for semi-persistent scheduling (SPS); wherein the configuration, which is specific to the UE, identifies allocated resources of a physical downlink shared channel (PDSCH) or a physical uplink shared channel (PUSCH) for the HARQ retransmissions; and use the allocated resources identified in the configuration for the HARQ retransmissions.

In some aspects, an apparatus for wireless communication may include means for receiving a configuration for hybrid automatic repeat request (HARQ) retransmissions for semi-persistent scheduling (SPS); wherein the configuration, which is specific to the apparatus, identifies allocated resources of a physical downlink shared channel (PDSCH) or a physical uplink shared channel (PUSCH) for the HARQ retransmissions; and means for using the allocated resources identified in the configuration for the HARQ retransmissions.

In some aspects, a method of wireless communication may include selecting a configuration for hybrid automatic repeat request (HARQ) retransmissions for semi-persistent scheduling (SPS) for a UE, based at least in part on parameters associated with the UE, by allocating resources of a physical downlink shared channel (PDSCH) or a physical uplink shared channel (PUSCH) for the HARQ retransmissions; and transmitting the configuration to the UE.

In some aspects, a base station for wireless communication may include memory and one or more processors operatively coupled to the memory. The memory and the one or more processors may be configured to select a configuration for hybrid automatic repeat request (HARQ) retransmissions for semi-persistent scheduling (SPS) for a UE, based at least in part on parameters associated with the UE, by allocating resources of a physical downlink shared channel (PDSCH) or a physical uplink shared channel (PUSCH) for the HARQ retransmissions; and transmit the configuration to the UE.

In some aspects, a non-transitory computer-readable medium may store one or more instructions for wireless communication. The one or more instructions, when executed by one or more processors of a base station, may cause the one or more processors to select a configuration for hybrid automatic repeat request (HARQ) retransmissions for semi-persistent scheduling (SPS) for a UE, based at least in part on parameters associated with the UE, by allocating resources of a physical downlink shared channel (PDSCH) or a physical uplink shared channel (PUSCH) for the HARQ retransmissions; and transmit the configuration to the UE.

In some aspects, an apparatus for wireless communication may include means for selecting a configuration for hybrid automatic repeat request (HARQ) retransmissions for semi-persistent scheduling (SPS) for a UE, based at least in part on parameters associated with the UE, by allocating resources of a physical downlink shared channel (PDSCH) or a physical uplink shared channel (PUSCH) for the HARQ retransmissions; and means for transmitting the configuration to the UE.

Aspects generally include a method, apparatus, system, computer program product, non-transitory computer-readable medium, user equipment, base station, access point, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
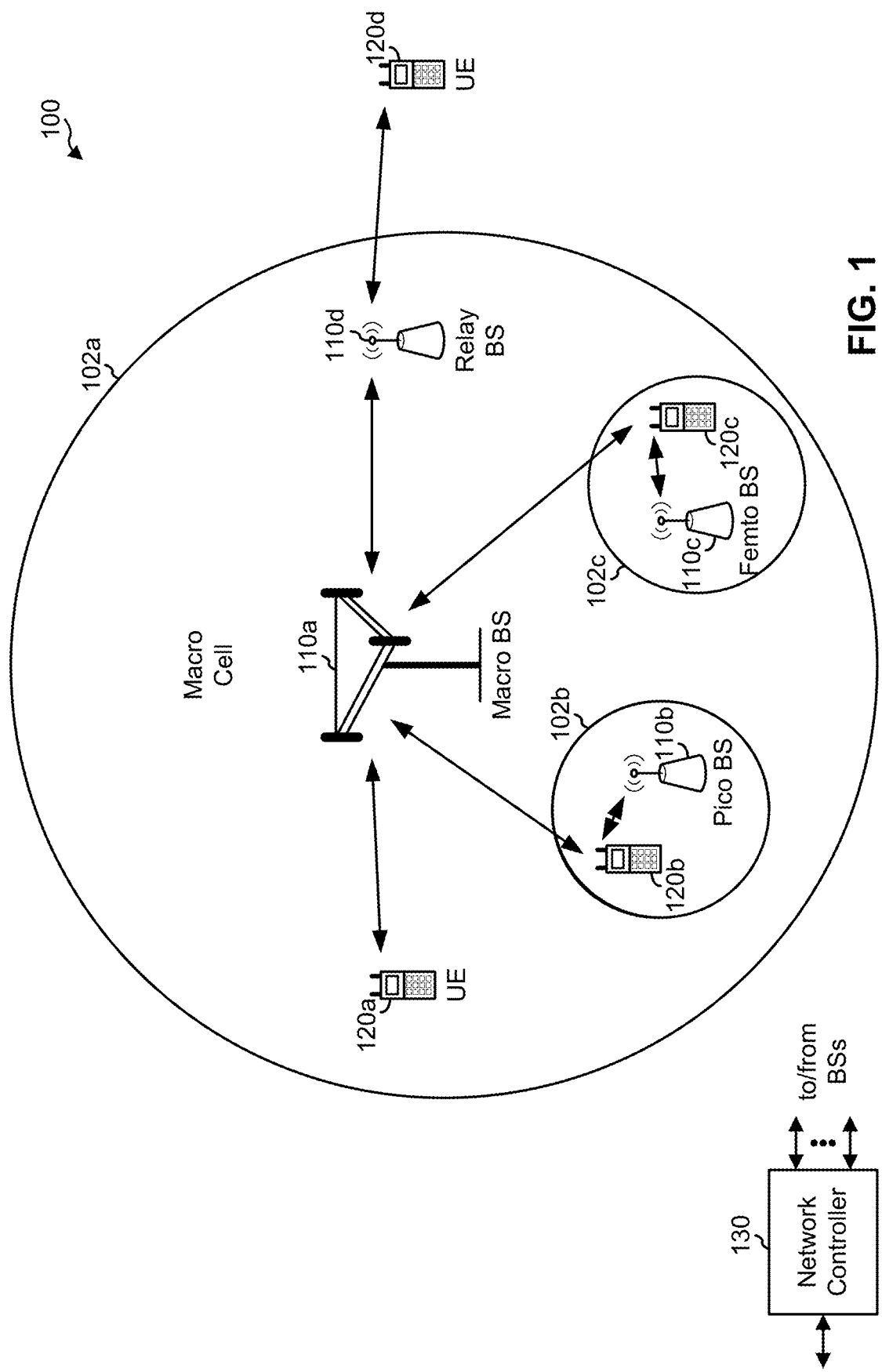
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some aspects, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
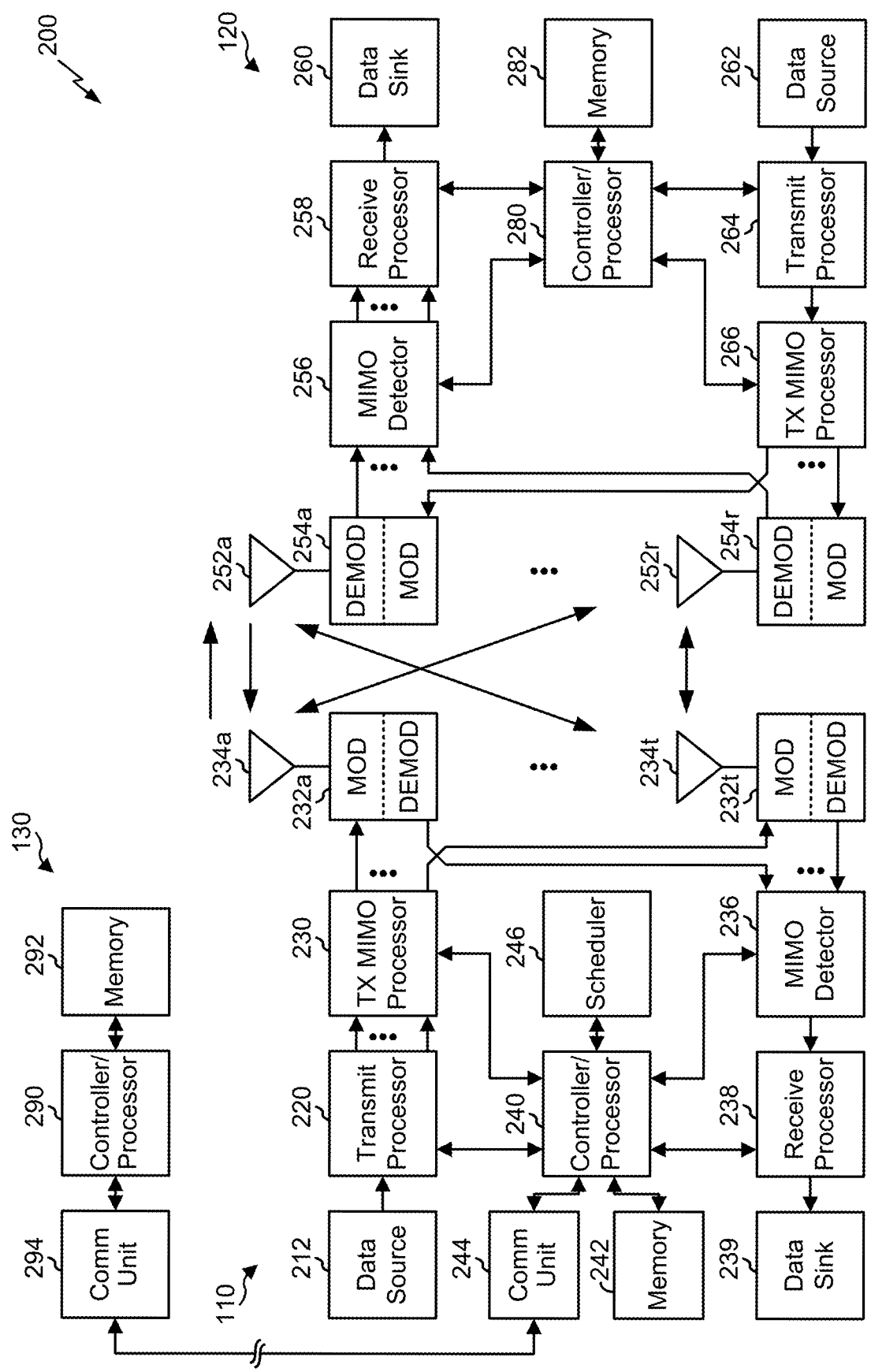
FIG. 2 is a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with HARQ retransmissions in ultra reliable low latency communication (URLLC) semi-persistent scheduling (SPS), as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a configuration for hybrid automatic repeat request (HARQ) retransmissions for semi-persistent scheduling (SPS); wherein the configuration, which is specific to UE 120, identifies allocated resources of a physical downlink shared channel (PDSCH) or a physical uplink shared channel (PUSCH) for the HARQ retransmissions, means for using the allocated resources identified in the configuration for the HARQ retransmissions, and/or the like. In some aspects, such means may include one or more components of UE 120 described in connection with FIG. 2.

In some aspects, base station 110 may include means for selecting a configuration for hybrid automatic repeat request (HARQ) retransmissions for semi-persistent scheduling (SPS) for UE 120, based at least in part on parameters associated with the UE 120, by allocating resources of a physical downlink shared channel (PDSCH) or a physical uplink shared channel (PUSCH) for the HARQ retransmissions, means for transmitting the configuration to UE 120, and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3:
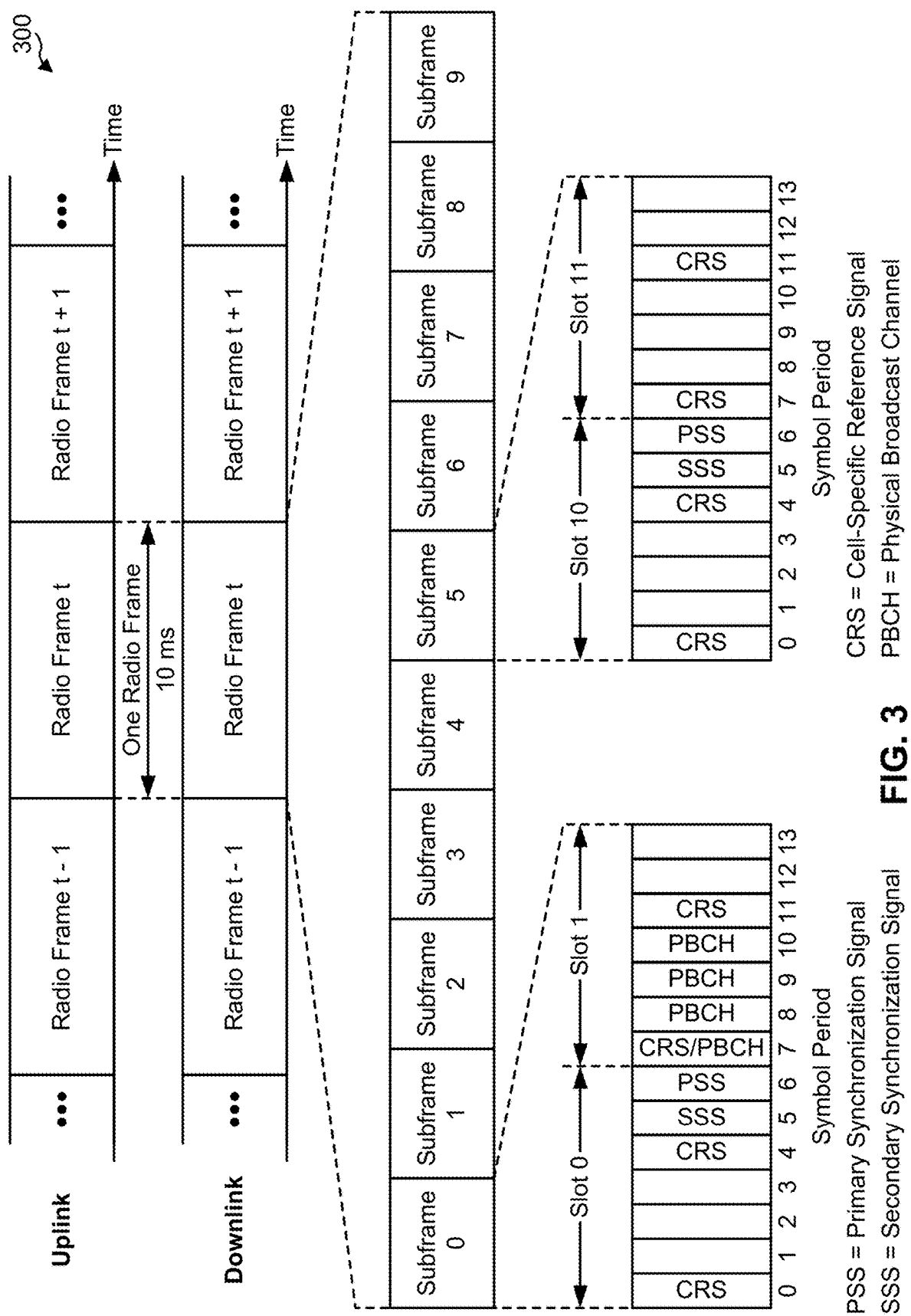
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such as NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
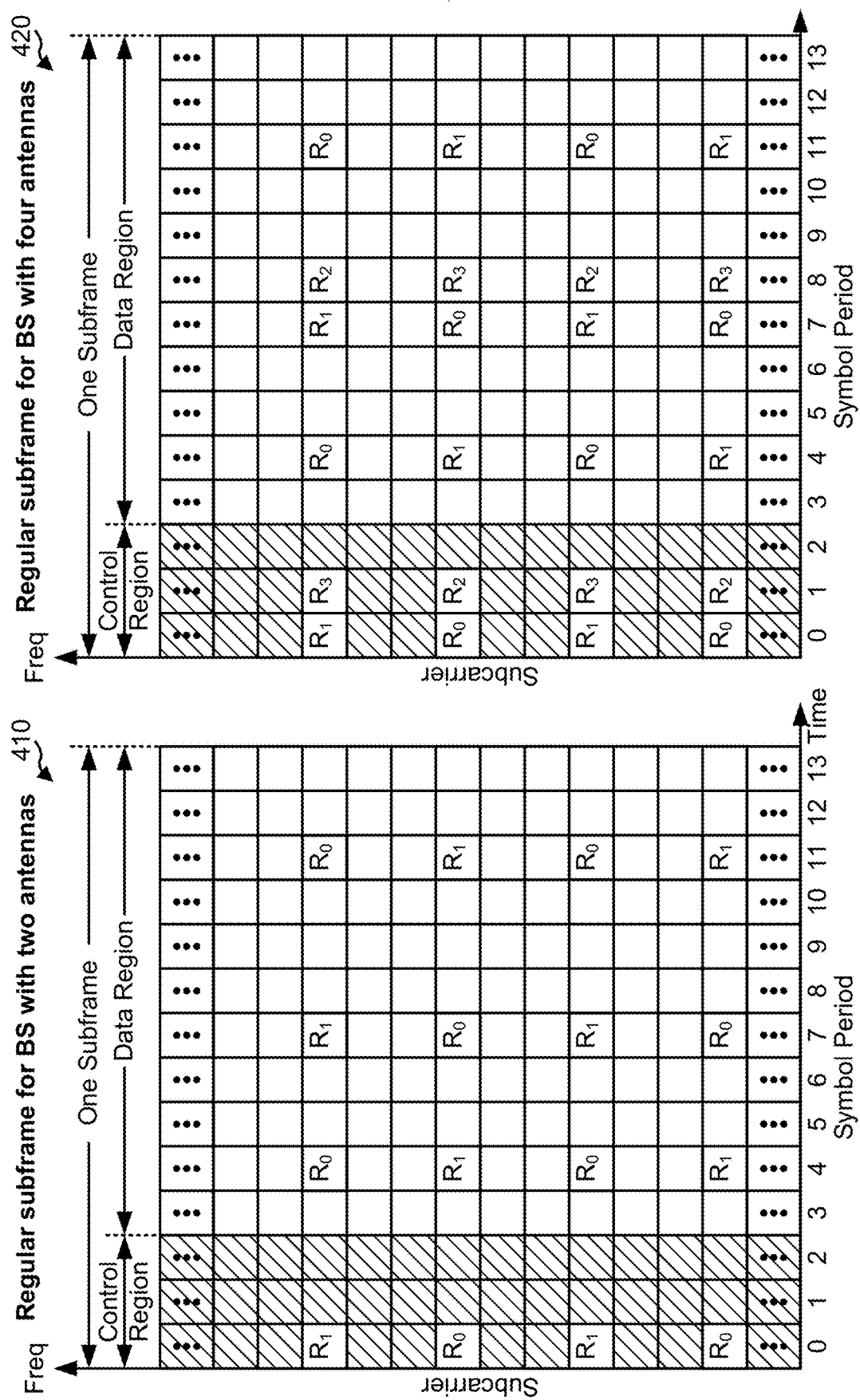
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic repeat request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
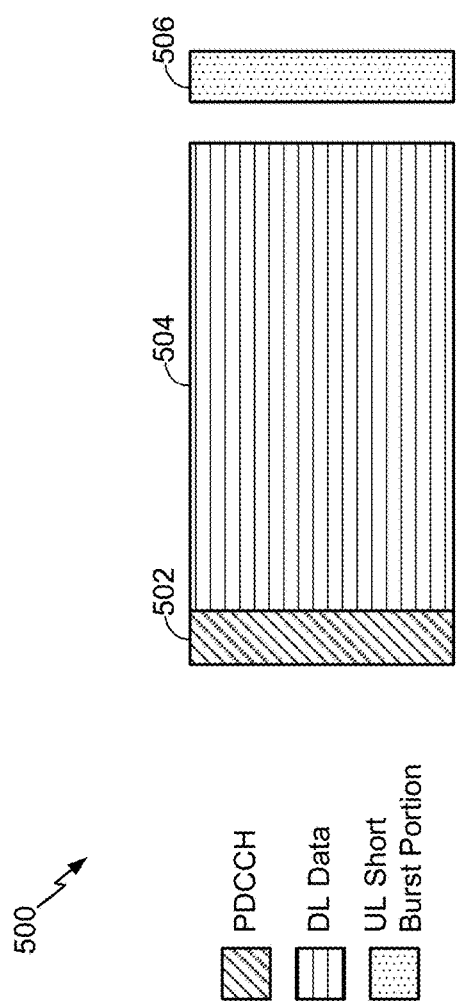
FIG. 5 is a diagram illustrating an example of a downlink (DL)-centric subframe, in accordance with certain aspects of the present disclosure.

FIG. 5 is a diagram 500 showing an example of a DL-centric subframe or wireless communication structure. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric subframe. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

According to some aspects, described herein, a UE specific synchronous HARQ may utilize predetermined resources of the physical downlink shared channel (PDSCH) and the physical uplink shared channel (PUSCH) for HARQ retransmissions and the reservation of the resources may be adaptively conservative such that a target reliability (e.g., $10^{-5} \sim 10^{-9}$ reliability) or threshold reliability can be achieved within a latency bound. As used here, the synchronous HARQ retransmission may be used via DL communication.

As indicated above, FIG. 5 is provided merely as an example. Other examples are possible and may differ from what was described with regard to FIG. 5.

Figure 6:
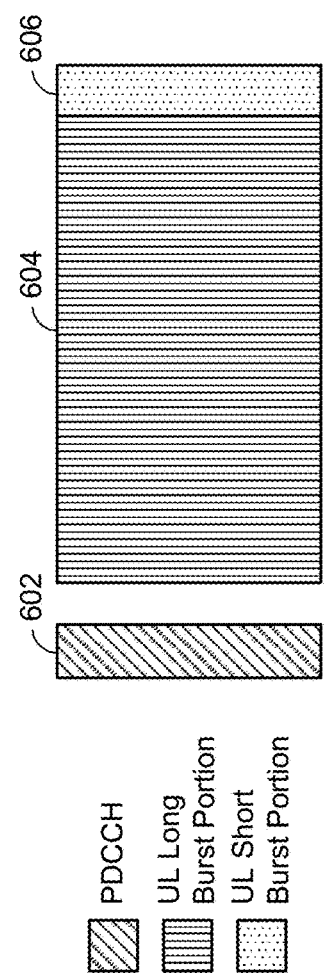
FIG. 6 is a diagram illustrating an example of an uplink (UL)-centric subframe, in accordance with certain aspects of the present disclosure.

FIG. 6 is a diagram 600 showing an example of an UL-centric subframe or wireless communication structure. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL long burst portion 604. The UL long burst portion 604 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 606. The UL short burst portion 606 in FIG. 6 may be similar to the UL short burst portion 606 described above with reference to FIG. 6, and may include any of the information described above in connection with FIG. 6. The foregoing is merely one example of an UL-centric wireless communication structure, and alternative structures having similar features may exist without necessarily deviating from the aspects described herein.

As mentioned above, a UE specific synchronous HARQ may utilize predetermined resources of the physical downlink shared channel (PDSCH) and the physical uplink shared channel (PUSCH) for HARQ retransmissions and the reservation of the resources may be adaptively conservative such that a target reliability (e.g., $10^{-5} \sim 10^{-9}$ reliability) or threshold reliability can be achieved within a latency bound. As used here, the synchronous HARQ retransmission may be used via UL communication.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 6 is provided merely as an example. Other examples are possible and may differ from what was described with regard to FIG. 6.

Figure 7:
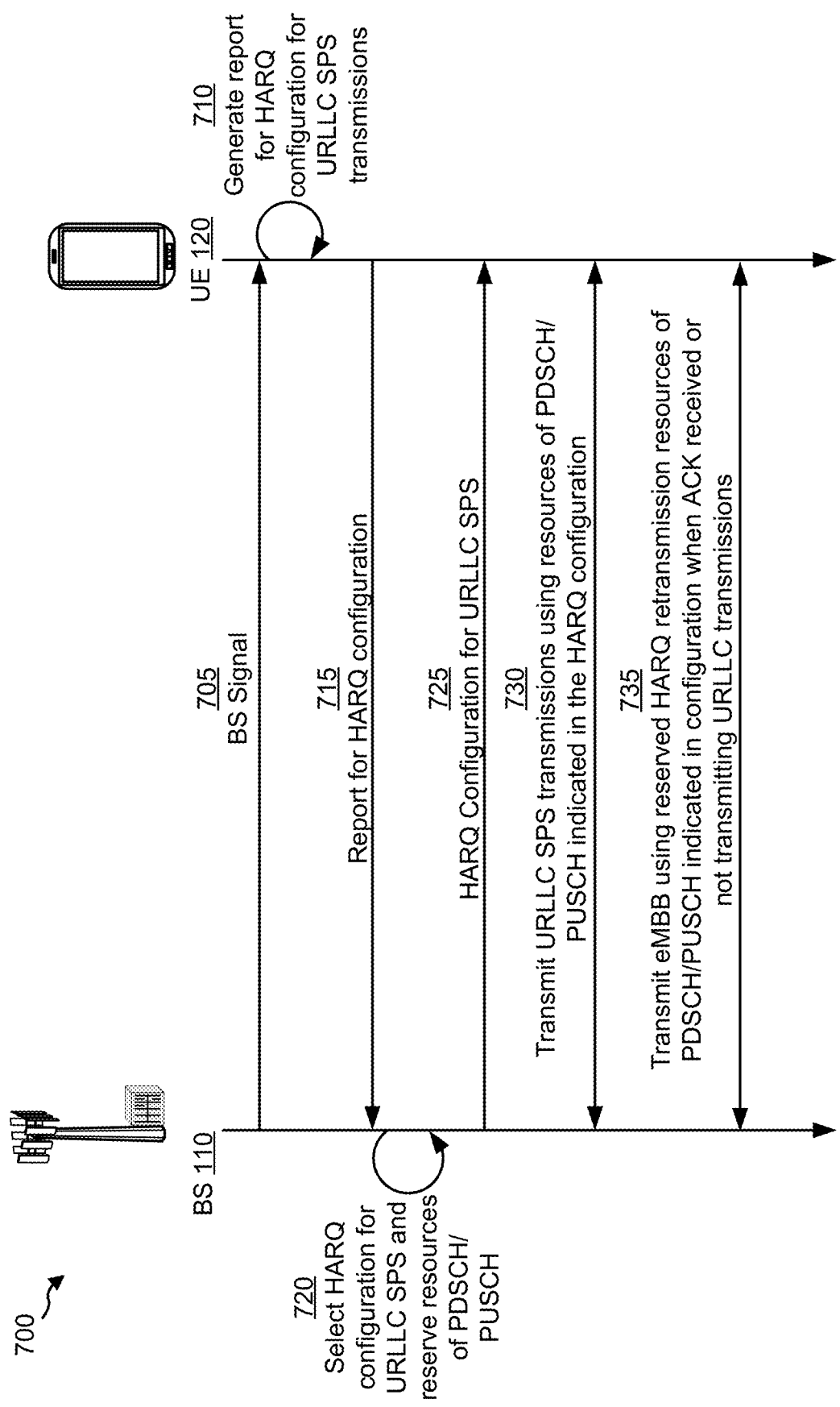
FIG. 7 is a diagram illustrating an example of a call flow for configuring a hybrid automatic repeat request (HARQ) configuration in ultra reliable low latency communication (URLLC) semi-persistent scheduling (SPS) transmissions, in accordance with various aspects of the present disclosure.

FIG. 7 is a diagram illustrating an example 700 of a call flow for a HARQ process in ultra reliable low latency (URLLC) semi-persistent scheduling (SPS) transmissions, in accordance with various aspects of the present disclosure. As shown in FIG. 7, BS 110 and UE 120 exchange information to establish a HARQ configuration to be used in URLLC SPS transmissions.

Semi-persistent scheduling (SPS) enables radio resources to be semi-statically configured and allocated to a UE for a longer time period than one subframe, thus, avoiding the need for specific downlink assignment messages or uplink grant messages over the PDCCH for each subframe. To configure SPS, radio resource control (RRC) signaling may indicate an interval at which the radio resources are periodically assigned. PDCCH signaling may indicate specific transmission resource allocations in the time/frequency domain and transmission attributes (e.g., modulation and control scheme (MCS), transmit power, and/or the like). For SPS in LTE UL, non-adaptive synchronous HARQ is performed. For example, non-adaptive retransmissions may be performed on a same resource and with a same MCS as was used for a last transmission. For SPS in LTE DL, adaptive asynchronous HARQ is performed. For example, adaptive retransmissions may be performed on a resource and, if provided, with the MCS indicated on the PDCCH.

Ultra reliable low latency communication (URLLC) requires ultra reliability (e.g., $10^{-5} \sim 10^{-9}$) and low latency (e.g., 500 μs). In NR UL, there may be two types of UL data transmission without grant: type 1, in which UL data transmission without grant is based at least in part on RRC (re)configuration without any L1 signaling; and type 2, in which UL data transmission without grant is based at least in part on both RRC configuration and L1 signaling for activation/deactivation of UL data transmission without grant.

However, the HARQ processes in LTE SPS may not be used in URLLC SPS and still enable transmissions to achieve the target reliability of URLLC and latency bound of URLLC. For example, adaptive asynchronous HARQ (which is used in LTE DL) uses the PDCCH, which has a low reliability (e.g., $10^{-2} \sim 10^{-3}$) because PDCCH is a one shot transmission. Accordingly, adaptive asynchronous HARQ using the PDCCH cannot achieve the target reliability of URLLC (e.g., $10^{-5} \sim 10^{-9}$), as the reliability of the PDCCH is much lower than the target reliability of URLLC. Additionally, if using non-adaptive synchronous HARQ (which is used in LTE UL), an achievable block error rate (BLER) of N HARQ transmissions (where N is determined by the latency bound of URLLC) may not achieve the target reliability of URLLC because the resources (e.g., time and frequency domain resources, MCS, power transmission, etc.) for each retransmission is not adaptive. Accordingly, because this HARQ process is non-adaptive (i.e., HARQ retransmission resources cannot be changed), and the latency requirements are changed for a transmission of data (e.g., to that of URLLC), the pre-reserved resources of the non-adaptive HARQ may not be sufficient to meet the latency requirements for that transmission of data.

According to some aspects herein, advantages from both adaptive asynchronous HARQ and non-adaptive synchronous HARQ may be leveraged for a HARQ scheme for URLLC SPS. Accordingly, some aspects herein provide a HARQ process for SPS that may satisfy a threshold reliability (e.g., a target reliability of URLLC) and a latency threshold (e.g., a latency bound of URLLC). In some aspects, a UE-specific configuration for a HARQ scheme for URLLC SPS may include using predetermined resources of PDSCH/PUSCH for HARQ retransmissions, such that allocations of the resources are adaptively conservative (e.g., the amount of resources are increased for each retransmission) so that a target reliability can be achieved within a latency bound. Accordingly, networks may avoid failures and/or shutdowns due to fewer SPS transmission errors or failures (e.g., due to achieving a target reliability of URLLC) and may experience improved performance, such as increased speed, throughput, capacity, and/or the like (e.g., due to achieving low latency bound of URLLC), thus conserving resources of the network devices.

As shown in FIG. 7, and by reference number 705, BS 110 sends a signal (referred to as a BS signal) that is received (or detected) by UE 120. For example, the BS signal may be a handoff signal, a beacon, and/or the like that is received when the UE 120 is within range of BS 110. UE 120, as shown by reference number 710, may generate a report for a configuration for HARQ retransmissions (which may be referred to herein as a HARQ configuration) for URLLC SPS transmissions for UE 120. For example, UE 120 may generate a report that indicates one or more parameters associated with UE 120. The one or more parameters may include at least one of a channel condition associated with UE 120, a power measurement of a signal associated with UE 120 and BS 110, a channel condition history associated with UE 120 (which may indicate reliability information, power transmission information, signal information (e.g., signal to noise ratio (SNR)), and/or the like), a historical traffic pattern associated with UE 120 (which may indicate types and/or an amount of traffic transmitted or received by UE 120), a performance measurement associated with UE 120 (e.g., a BLER), and/or the like. In some aspects, UE 120 may generate the report based at least in part on receiving the BS signal. Additionally, or alternatively, UE 120 may periodically or aperiodically (e.g., based at least in part on receiving BS signals, based at least in part on sending or receiving URLLC transmissions, and/or the like) generate the report for the HARQ configuration for URLLC SPS transmissions.

As further shown in FIG. 7, and by reference number 715, UE 120 transmits the report to BS 110. For example, UE 120 may transmit the report to BS 110 to enable BS 110 to select a configuration for HARQ retransmissions for URLLC SPS transmissions. As shown by reference number 720, BS 110 selects the HARQ configuration for URLLC SPS and reserves resources of the PDSCH and/or PUSCH for the HARQ retransmissions for the URLLC SPS transmissions. In some aspects, the configuration is specific to UE 120, such that UE 120 may have a different configuration of resources of the PDSCH/PUSCH for HARQ retransmissions for SPS transmissions than another different UE in communication with BS 110. According to some aspects, the HARQ configuration indicates at least one of an allocation of the resources in a time domain, an allocation of the resources in a frequency domain, one or more transmission attributes for the retransmissions (e.g., a MCS, a transmit power, and/or the like), and/or the like. Additionally, or alternatively, BS 110 reserves or allocates resources of the PDSCH and/or PUSCH for the HARQ retransmissions to meet a threshold reliability and a threshold latency. In some aspects, BS 110 may allocate the resources of the PDSCH and/or PUSCH for the HARQ retransmissions by reserving additional resources for each subsequent HARQ retransmission without explicit channel quality indicator (CQI) feedback. Accordingly, for each retransmission, an amount of resources may be increased (e.g., by adjusting MCS and/or transmission power for the retransmission).

In some aspects, BS 110 may maintain and use a table of historical values of parameters of UE 120 (and/or other UEs) to select a configuration for HARQ retransmissions for UE 120. In such aspects, the table may indicate appropriate resource allocations (e.g., in the time domain and/or frequency domain) and/or transmission attributes (e.g., MCS and/or transmission power) for HARQ retransmissions based at least in part on values of one or more parameters received from UEs (e.g., UE 120). BS 110 may select the HARQ configuration for UE 120 based at least in part on values of parameters received from UE 120 in the report. In some aspects, BS 110 may maintain and update the table based at least in part on tracking configurations and/or historical data associated with HARQ configurations. Accordingly, a table maintained and utilized by BS 110 may be different than a table used by a different BS. In some aspects, multiple BSs, including BS 110, may have access to a same table (e.g., that is distributed and/or maintained by a mobility management entity (MME)).

As further shown in FIG. 7, and by reference number 725, BS 110 transmits the HARQ configuration for URLLC SPS transmissions to UE 120. For example, BS 110 may transmit the HARQ configuration via a radio resource control (RRC) channel and/or the PDCCH. Accordingly, UE 120 and/or BS 110, as shown by reference number 730, may transmit URLLC SPS transmissions using the resources of the PDSCH and/or PUSCH indicated in the HARQ configuration. An example implementation of the configuration for URLLC SPS transmissions is further described below in connection with FIG. 8.

As further shown in FIG. 7, and by reference number 735, BS 110 and/or UE 120 may transmit eMBB using reserved HARQ retransmission resources of the PDSCH and/or PUSCH indicated in the configuration when an ACK is received or when BS 110 and/or UE 120 are not transmitting URLLC transmissions. For example, UE 120 may determine that a URLLC transmission has been successful using the HARQ configuration and, thus, may transmit an ACK to BS 110. Based at least in part on receiving the ACK, BS 110 may use reserved resources for HARQ retransmissions for the URLLC SPS to transmit eMBB traffic to UE 120. Additionally, or alternatively, BS 110 may detect that traffic received from UE 120 is not URLLC, and therefore may use reserved resources for URLLC SPS transmissions to transmit eMBB traffic. In such aspects, BS 110 may schedule the transmission of the eMBB traffic via the PDCCH.

As indicated above, FIG. 7 is provided as an example. Other examples are possible and may differ from what was described with respect to FIG. 7.

Figure 8:
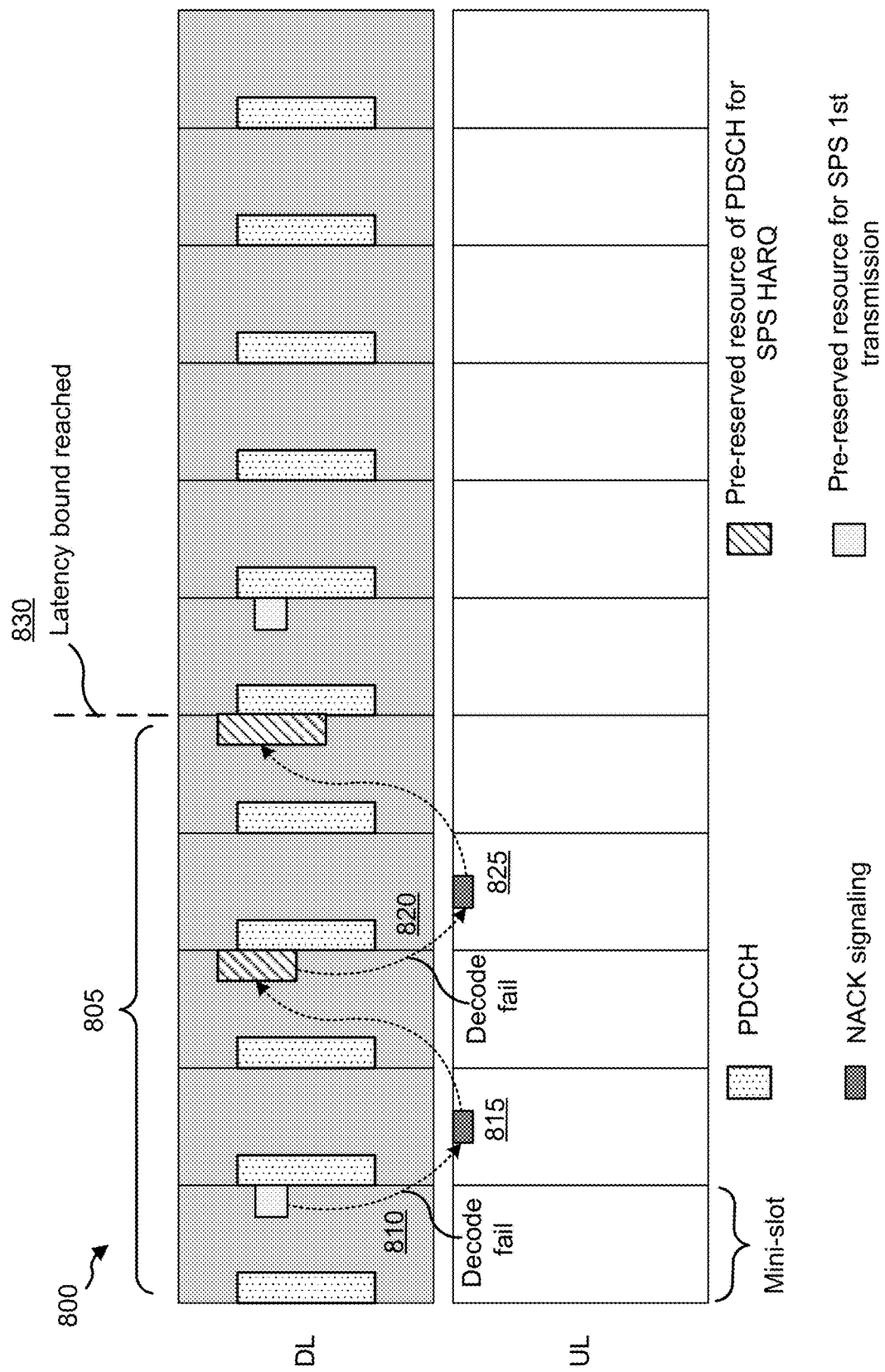
FIG. 8 is a diagram illustrating an example configuration for HARQ retransmissions for URLLC SPS, in accordance with various aspects of the present disclosure.

FIG. 8 is a diagram illustrating an example 800 of a configuration 805 for HARQ retransmissions for URLLC SPS in accordance with various aspects of the present disclosure. As shown in FIG. 8, a configuration 805 includes predetermined retransmission resource reservation (e.g., in mini-slots of a subframe) to be adaptively conservative (e.g., more or less conservative based at least in part on parameters of UE 120) in order to meet a threshold reliability (e.g., a target reliability of URLLC) within a threshold latency (e.g., a latency bound of URLLC).

In FIG. 8, each retransmission resource is conservative in that more than an expected amount of resources (e.g., and/or lower MCS and higher transmission power) is reserved so that reliability for retransmissions is enhanced without explicit CQI feedback. As shown, configuration 805 increases an amount of resources over retransmissions. Accordingly, as a HARQ index goes up (corresponding to an amount of retransmissions needed) for an SPS transmission, the amount of resources in the configuration may increase. Therefore, as shown in configuration 805 of FIG. 8, a second transmission is reserved with more resources (e.g., and/or higher transmission power and/or lower MCS) than the first transmission, a third transmission is reserved with more resources than the second transmission, and/or the like. As mentioned above, the amount of resources needed for each transmission may be determined prior to the first transmission using the configuration based at least in part on reliability requirements and/or latency requirements (e.g., requirements of URLLC).

As shown in FIG. 8, and by reference number 810, for a first transmission in the DL, a decode fail occurs. Accordingly, as shown by reference number 815, a NACK signal is transmitted in the UL. As shown by reference number 820, another decode fail occurs using reserved resources for a first retransmission (which, as shown, are greater than the amount of resources reserved for the first transmission). Accordingly, a second NACK signal is transmitted in the UL, as shown by reference number 825. After receiving the second NACK, reserved resources for a second retransmission (which, as shown, are greater than the amount of resources for the first retransmission) may be used for the SPS transmission. As shown by reference number 830, after the reserved resources for the second retransmission are used, the latency bound (e.g., of URLLC) may be reached, and the HARQ process for configuration 805 may end. For example, the configuration may not allocate resources beyond a threshold latency for the SPS transmission. As such, unless the second retransmission was successfully decoded using the reserved resources for the second retransmission, the SPS may fail. However, using configuration 805 to meet the target reliability of URLLC, a failure may occur only after all retransmissions for an SPS transmission (e.g., once for every 100,000 SPS transmissions or less (e.g., as low as once every 1,000,000,000 SPS transmissions)). Accordingly, configuration 805 reserves resources for HARQ retransmissions to enable URLLC SPS transmissions.

Although the example configuration 805 is shown in the DL, aspects herein may be implemented in the UL. Accordingly, HARQ retransmissions for SPS transmission may satisfy a target reliability and/or latency bound of URLLC.

As indicated above, FIG. 8 is provided as an example. Other examples are possible and may differ from what was described with respect to FIG. 8.

Figure 9:
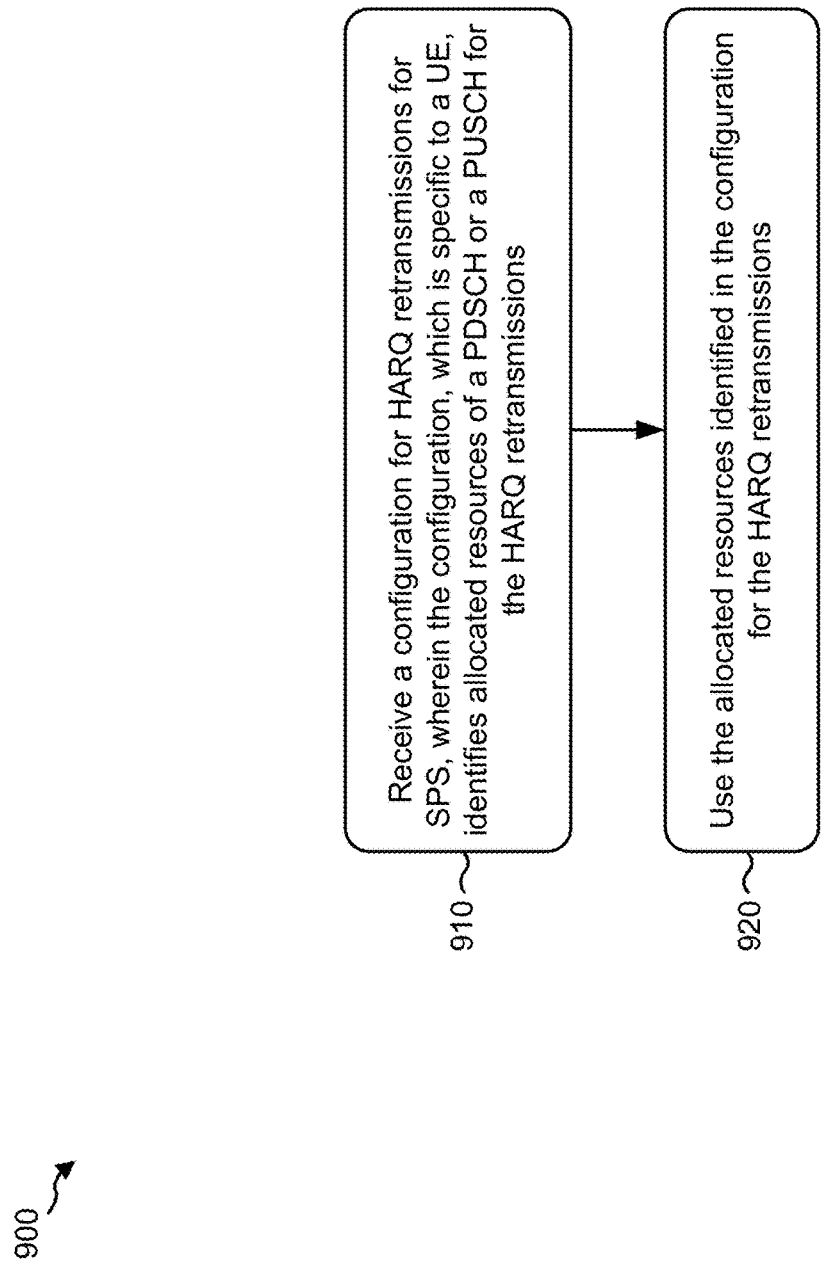
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) performs URLLC SPS using HARQ retransmission configurations, according to some aspects described herein.

As shown in FIG. 9, in some aspects, process 900 may include receiving a configuration for HARQ retransmissions for SPS, wherein the configuration, which is specific to a UE, identifies allocated resources of a PDSCH or a PUSCH for the HARQ retransmissions (block 910). For example, the UE (e.g., using antenna 252, DEMOD 254, MIMO detector 256, receive processor 258, controller/processor 280, and/or the like) may receive the configuration for HARQ retransmissions for SPS, as described above in connection with FIGS. 7-8. In some aspects, the configuration may be UE-specific. Additionally, or alternatively, the configuration may identify allocated resources of a PDSCH or a PUSCH for the HARQ retransmissions.

As further shown in FIG. 9, in some aspects, process 900 may include using the allocated resources identified in the configuration for the HARQ retransmissions (block 920). For example, the UE (e.g., using antenna 252, DEMOD 254, MIMO detector 256, receive processor 258, controller/processor 280, and/or the like) may use the allocated resources identified in the configuration for the HARQ retransmissions, as described above in connection with FIGS. 7-8.

Process 900 may include additional aspects, such as any single aspect or any combination of aspects described below and/or in connection with one or more other processes described elsewhere herein.

In some aspects, the configuration for the HARQ retransmissions is selected to meet at least one of a threshold reliability or a threshold latency. In some aspects, the UE may be configured to receive the configuration by receiving the configuration via at least one of a RRC channel or a PDCCH.

In some aspects, the UE may be configured to generate a report indicating one or more parameters associated with the UE and transmit the report to permit the one or more parameters to be used to determine the configuration. For example, the one or more parameters may include at least one of: a channel condition associated with the UE, a power measurement of a signal associated with the UE and a base station with which the UE is in communication, a channel condition history associated with the UE, a historical traffic pattern associated with the UE, or a performance measurement associated with the UE.

In some aspects, the UE may be configured to receive a signal from a base station and transmit a report to the base station based at least in part on receiving the signal from the base station, where the report indicates one or more parameters associated with the UE to permit the one or more parameters to be used to determine the configuration.

In some aspects, the configuration may indicate at least one of an allocation of the allocated resources in a time domain, an allocation of the allocated resources in a frequency domain, or one or more transmission attributes including at least one of: a modulation and coding scheme (MCS) or a transmit power.

In some aspects, the allocated resources may be allocated to meet the threshold reliability and the threshold latency via additional resources reserved for each subsequent HARQ retransmission without explicit channel quality indicator (CQI) feedback. For example, the additional resources may be reserved such that each subsequent HARQ retransmission has a greater amount of resources than each prior HARQ retransmission. As another example, the additional resources may be reserved such that each subsequent HARQ retransmission has at least one of a higher power transmission or a lower modulation and coding scheme (MCS) relative to each prior HARQ retransmission.

In some aspects, the UE may be configured to determine that a transmission of the SPS fails and transmit a non-acknowledgement (NACK) message based at least in part on the failed transmission.

In some aspects, the UE may be configured to determine that a transmission of the SPS is successful and transmit an ACK message based at least in part on determining that the allocated resources are sufficient. In some aspects, the UE may be configured to receive eMBB traffic, scheduled via a PDCCH, using a resource identified for at least one of the HARQ retransmissions.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
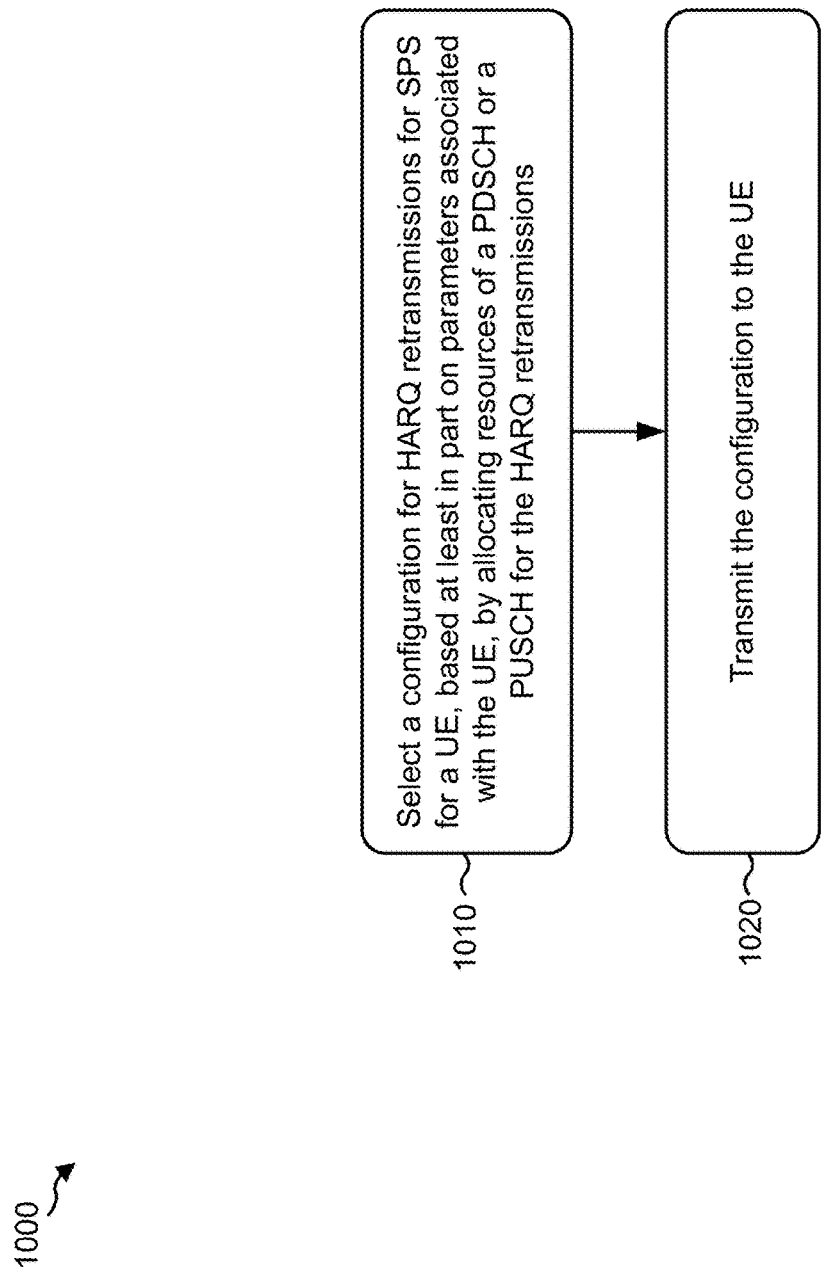
FIG. 10 is a diagram illustrating an example process performed, for example, by a base station, in accordance with various aspects of the present disclosure.

FIG. 10 is a diagram illustrating an example process 1000 performed, for example, by a BS, in accordance with various aspects of the present disclosure. Example process 1000 is an example where a BS (e.g., BS 110) selects a configuration for HARQ retransmissions for URLLC SPS transmissions.

As shown in FIG. 10, in some aspects, process 1000 may include selecting a configuration for HARQ retransmissions for SPS for a UE, based at least in part on parameters associated with the UE, by allocating resources of a PDSCH or a PUSCH for the HARQ retransmissions (block 1010). For example, the base station (e.g., using controller/processor 240 and/or the like) may select the configuration for HARQ retransmissions for SPS for the UE, as described above in connection with FIGS. 7-8. In some aspects, the base station may select the configuration based at least in part on parameters associated with the UE. Additionally, or alternatively, the base station may select the configuration by allocating resources of a PDSCH or a PUSCH for the HARQ retransmissions.

As further shown in FIG. 10, in some aspects, process 1000 may include transmitting the configuration to the UE (block 1020). For example, the base station (e.g., using controller/processor 240, transmit processor 220, TX MIMO processor 230, MOD 232, antenna 234, and/or the like) may transmit the configuration to the UE, as described above in connection with FIGS. 7-8.

Process 1000 may include additional aspects, such as any single aspect or any combination of aspects described below and/or in connection with one or more other processes described elsewhere herein.

In some aspects, the configuration for the HARQ retransmissions is selected to meet at least one of a threshold reliability or a threshold latency. In some aspects, the BS may be configured to transmit the configuration via at least one of a RRC channel or a PDCCH. In some aspects, the configuration may include at least one of an allocation of the resources in a time domain, an allocation of the resources in a frequency domain, or one or more transmission attributes including at least one of: a modulation and coding scheme (MCS) or a transmit power.

In some aspects, the BS may be configured to receive one or more parameters in a report from the UE, where the one or more parameters include at least one of: a channel condition associated with the UE, a power measurement of a signal associated with the UE and the base station, a channel condition history associated with the UE, a historical traffic pattern associated with the UE, or a performance measurement associated with the UE; and use the one or more parameters to select the configuration.

In some aspects, the BS may be configured to receive a non-acknowledgment (NACK) message from the UE for a first retransmission of the HARQ retransmissions and allocate additional resources for a second retransmission of the HARQ retransmission based at least in part on the NACK message. In some aspects, the BS may be configured to receive an acknowledgment (ACK) message from the UE for a retransmission of the HARQ retransmissions and schedule enhanced mobile broadband (eMBB) traffic using one or more remaining resources of the resources allocated for the HARQ retransmissions.

In some aspects, the BS may be configured to allocate the allocated resources to meet the threshold reliability and the threshold latency by reserving additional resources for each subsequent HARQ retransmission without explicit channel quality indicator (CQI) feedback. For example, reserving the additional resources for each subsequent HARQ retransmission may include reserving a greater amount of resources than each prior HARQ retransmission. As another example, reserving the additional resources for each subsequent retransmission may include configuring the transmission attributes to include a higher power and/or a lower MCS relative to each prior retransmission.

In some aspects, the configuration does not allocate the resources for the HARQ retransmissions after the threshold latency is reached.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a configuration for hybrid automatic repeat request (HARQ) retransmissions for semi-persistent scheduling (SPS),
   wherein the configuration, which is specific to the UE, identifies allocated resources of a physical downlink shared channel (PDSCH) or a physical uplink shared channel (PUSCH) for the HARQ retransmissions, and
   wherein the allocated resources are allocated without explicit channel quality indicator (CQI) feedback and such that each subsequent HARQ retransmission has a higher power transmission than each prior HARQ retransmission so that a latency threshold is satisfied; and
   using the allocated resources identified in the configuration for the HARQ retransmissions.

2. The method of claim 1, wherein the configuration for the HARQ retransmissions is selected to meet a threshold reliability associated with the latency threshold.

3. The method of claim 1, wherein the UE is configured to:
   generate a report indicating one or more parameters associated with the UE; and
   transmit the report to permit the one or more parameters to be used to determine the configuration.

4. The method of claim 3, wherein the one or more parameters include at least one of:
   a channel condition associated with the UE,
   a power measurement of a signal associated with the UE and a base station with which the UE is in communication,
   a channel condition history associated with the UE,
   a historical traffic pattern associated with the UE, or
   a performance measurement associated with the UE.

5. The method of claim 1, further comprising:
   receiving a signal from a base station; and
   transmitting a report to the base station based at least in part on receiving the signal from the base station,
   the report indicating one or more parameters associated with the UE to permit the one or more parameters to be used to determine the configuration.

6. The method of claim 1, wherein the configuration is received via at least one of a radio resource control (RRC) channel or a physical downlink control channel (PDCCH).

7. The method of claim 1, further comprising:
   determining that a transmission of the SPS fails; and
   transmitting a non-acknowledgement (NACK) message based at least in part on the failed transmission.

8. The method of claim 1, further comprising:
   determining that a transmission of the SPS has been successful; and
   transmitting an acknowledgement (ACK) message based at least in part on determining that the allocated resources are sufficient.

9. The method of claim 1, further comprising:
   receiving enhanced mobile broadband (eMBB) traffic, scheduled via a physical downlink control channel (PDCCH), using a resource identified for at least one of the HARQ retransmissions.

10. The method of claim 1, wherein the configuration indicates at least one of:
    an allocation of the allocated resources in a time domain,
    an allocation of the allocated resources in a frequency domain, or
    one or more transmission attributes including at least one of:
    a modulation and coding scheme (MCS), or
    a transmit power.

11. The method of claim 1, wherein the allocated resources are allocated by reserving additional resources.

12. The method of claim 11, wherein, when the allocated resources are allocated, the additional resources are reserved such that each subsequent HARQ retransmission has a greater amount of resources than each prior HARQ retransmission.

13. The method of claim 11, wherein, when the allocated resources are allocated, the additional resources are reserved such that each subsequent HARQ retransmission has a lower modulation and coding scheme (MCS) relative to each prior HARQ retransmission.

14. A method of wireless communication performed by a base station, comprising:
    selecting a configuration for hybrid automatic repeat request (HARQ) retransmissions for semi-persistent scheduling (SPS) for a user equipment (UE), based at least in part on parameters associated with the UE, by allocating resources of a physical downlink shared channel (PDSCH) or a physical uplink shared channel (PUSCH) for the HARQ retransmissions,
    wherein selecting the configuration comprises allocating the resources without explicit channel quality indicator (CQI) feedback and such that each subsequent HARQ retransmission has a higher power transmission than each prior HARQ retransmission so that a latency threshold is satisfied; and
    transmitting the configuration to the UE.

15. The method of claim 14, wherein the configuration for the HARQ retransmissions is selected to meet a threshold reliability a associated with the latency threshold.

16. The method of claim 14, further comprising:
    transmitting the configuration via at least one of a radio resource control (RRC) channel or a physical downlink control channel.

17. The method of claim 14, further comprising:
    receiving one or more parameters in a report from the UE, wherein the one or more parameters include at least one of:
    a channel condition associated with the UE,
    a power measurement of a signal associated with the UE and the base station,
    a channel condition history associated with the UE,
    a historical traffic pattern associated with the UE, or
    a performance measurement associated with the UE; and
    using the one or more parameters to select the configuration.

18. The method of claim 14, further comprising:
    receiving a non-acknowledgment (NACK) message from the UE for a first retransmission of the HARQ retransmissions; and
    allocating additional resources for a second retransmission of the HARQ retransmission based at least in part on the NACK message.

19. The method of claim 14, further comprising:
receiving an acknowledgment (ACK) message from the UE for a retransmission of the HARQ retransmissions; and
scheduling enhanced mobile broadband (eMBB) traffic using one or more remaining resources of the resources allocated for the HARQ retransmissions.

20. The method of claim 14, wherein the configuration includes at least one of:
an allocation of the resources in a time domain,
an allocation of the resources in a frequency domain, or
one or more transmission attributes including at least one of:
a modulation and coding scheme (MCS), or
a transmit power.

21. The method of claim 14, wherein selecting the configuration comprises allocating the resources by reserving additional resources for each subsequent HARQ retransmission.

22. The method of claim 21, wherein reserving the additional resources for each subsequent retransmission includes configuring transmission attributes to include a lower modulation and coding scheme (MCS) relative to each prior HARQ retransmission.

23. The method of claim 14, wherein the configuration does not allocate the resources for the HARQ retransmissions after a threshold latency is reached.

24. A user equipment (UE) for wireless communication, comprising:
a memory; and
one or more processors operatively coupled to the memory, the memory and the one or more processors configured to:
receive a configuration for hybrid automatic repeat request (HARQ) retransmissions for semi-persistent scheduling (SPS),
wherein the configuration, which is specific to the UE, identifies allocated resources of a physical downlink shared channel (PDSCH) or a physical uplink shared channel (PUSCH) for the HARQ retransmissions, and
wherein the allocated resources are allocated without explicit channel quality indicator (CQI) feedback and such that each subsequent HARQ retransmission has a higher power transmission than each prior HARQ retransmission so that a latency threshold is satisfied; and
use the allocated resources identified in the configuration for the HARQ retransmissions.

25. The UE of claim 24, wherein the allocated resources are allocated by reserving additional resources for each subsequent HARQ retransmission without explicit channel quality indicator (CQI) feedback.

26. The UE of claim 25, wherein, when the allocated resources are allocated, the additional resources are reserved such that each subsequent HARQ retransmission has a lower modulation and coding scheme (MCS) relative to each prior HARQ retransmission.

27. The UE of claim 24, wherein the configuration for the HARQ retransmissions is selected to meet a threshold reliability associated with the latency threshold.

28. A base station for wireless communication, comprising:
a memory; and
one or more processors operatively coupled to the memory, the memory and the one or more processors configured to:
select a configuration for hybrid automatic repeat request (HARQ) retransmissions for semi-persistent scheduling (SPS) for a user equipment (UE), based at least in part on parameters associated with the UE, by allocating resources of a physical downlink shared channel (PDSCH) or a physical uplink shared channel (PUSCH) for the HARQ retransmissions,
wherein selecting the configuration comprises allocating the resources without explicit channel quality indicator (CQI) feedback and such that each subsequent HARQ retransmission has a higher power transmission than each prior HARQ retransmission so that a latency threshold is satisfied; and
transmit the configuration to the UE.

29. The base station of claim 28, wherein selecting the configuration comprises allocating the resources by reserving additional resources for each subsequent HARQ retransmission.

30. The base station of claim 29, wherein reserving the additional resources for each subsequent HARQ retransmission includes configuring transmission attributes to include a lower modulation and coding scheme (MCS) relative to each prior HARQ retransmission.

* * * * *